US011157696B1

(12) United States Patent
Ramos et al.

(10) Patent No.: US 11,157,696 B1
(45) Date of Patent: Oct. 26, 2021

(54) LANGUAGE AGNOSTIC PHONETIC ENTITY RESOLUTION

(71) Applicant: Amazon Technologies, Inc., Seattle, WA (US)

(72) Inventors: David Paul Ramos, Mountain View, CA (US); Ameya Ashok Limaye, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 175 days.

(21) Appl. No.: 16/017,313

(22) Filed: Jun. 25, 2018

(51) Int. Cl.
*G06F 40/295* (2020.01)
*G10L 15/22* (2006.01)
*G10L 15/02* (2006.01)
*G10L 15/18* (2013.01)

(52) U.S. Cl.
CPC ............ *G06F 40/295* (2020.01); *G10L 15/02* (2013.01); *G10L 15/18* (2013.01); *G10L 15/22* (2013.01); *G10L 2015/025* (2013.01)

(58) Field of Classification Search
CPC ....... G06F 40/295; G10L 15/02; G10L 15/18; G10L 15/22; G10L 2015/025
See application file for complete search history.

(56) References Cited

U.S. PATENT DOCUMENTS

| 9,240,181 | B2 * | 1/2016 | Khare | G10L 15/187 |
| 2015/0081294 | A1 * | 3/2015 | Hsu | G10L 15/26 704/235 |
| 2015/0286629 | A1 * | 10/2015 | Abdel-Reheem | G06F 40/45 704/9 |
| 2016/0093298 | A1 * | 3/2016 | Naik | G10L 13/08 704/235 |
| 2016/0336008 | A1 * | 11/2016 | Menezes | G06F 40/295 |

* cited by examiner

*Primary Examiner* — Nafiz E Hoque
(74) *Attorney, Agent, or Firm* — Pierce Atwood LLP

(57) ABSTRACT

Techniques for performing entity resolution as part of natural language understanding processing are described. During offline operations, a system may convert text (representing entities known to the system) into audio of various languages. The languages into which the text is converted may depend on the location where the entity is likely to be spoken by users of the system. At runtime, the system processes a user input using text-based entity resolution. If text-based entity resolution fails, the system may identify user speech corresponding to an entity to be resolved, and attempt to phonetically match the user speech to the audio of the known entities. Results of the phonetic entity resolution may then used by downstream components, such as skills.

22 Claims, 11 Drawing Sheets

LANGUAGE AGNOSTIC PHONETIC ENTITY RESOLUTION

BACKGROUND

Speech recognition systems have progressed to the point where humans can interact with computing devices using their voices. Such systems employ techniques to identify the words spoken by a human user based on the various qualities of a received audio input. Speech recognition processing combined with natural language understanding processing enable speech-based user control of a computing device to perform tasks based on the user's spoken commands. The combination of speech recognition processing and natural language understanding processing techniques is referred to herein as speech processing. Speech processing may also involve converting a user's speech into text data which may then be provided to skills.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
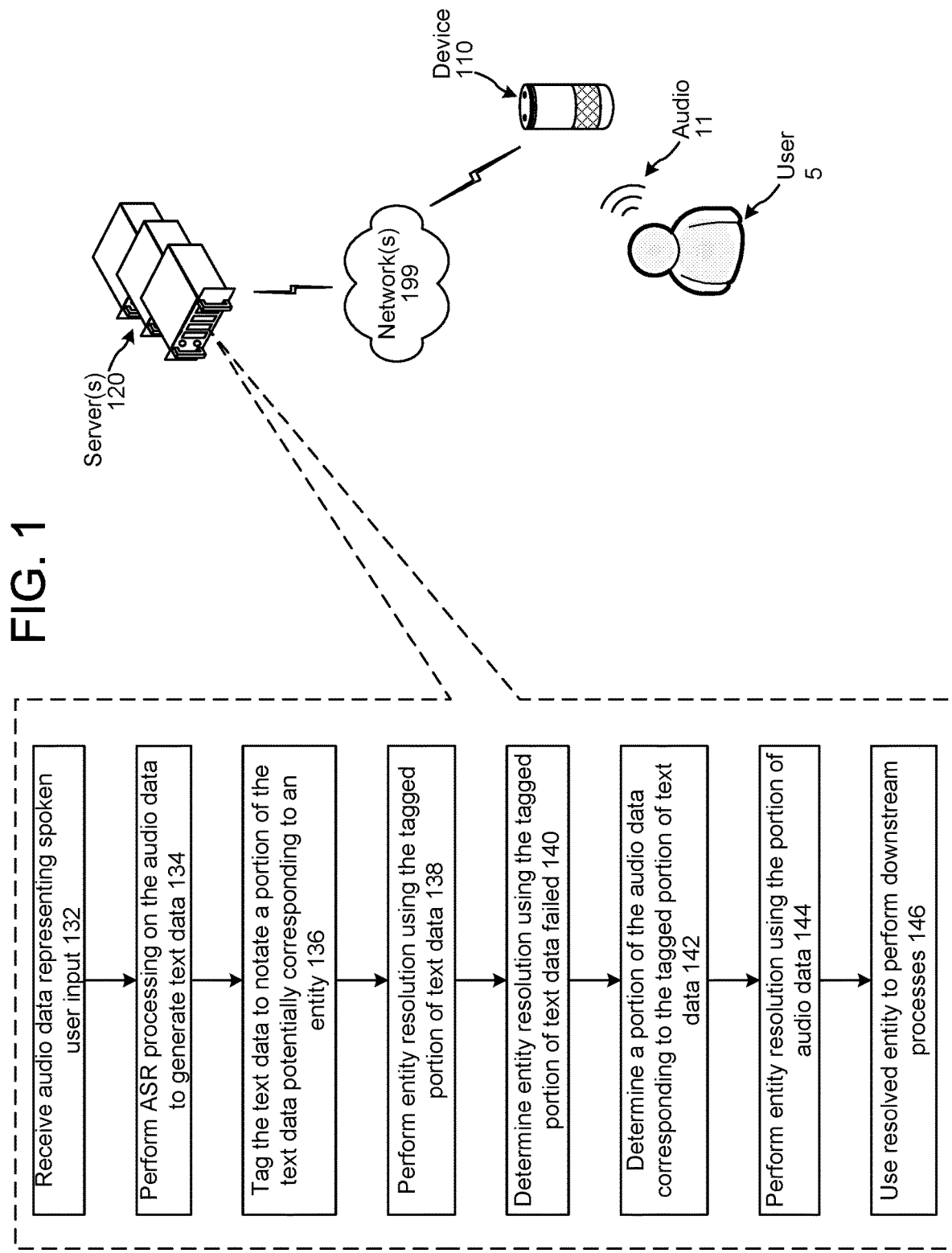
FIG. 1 illustrates a system configured to perform entity resolution using a language agnostic phonetic search according to embodiments of the present disclosure.

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with the generation of synthesized speech. ASR, NLU, and TTS may be used together as part of a system.

Certain systems may be configured to perform actions in response to user inputs. For example, for the user input of "Alexa, play Adele music," a system may output music sung by Adele. For further example, for the user input of "Alexa, what is the weather," a system may output synthesized speech representing weather information for a geographic location of the user. In another example, for the user input of "Alexa, make me a dinner reservation," a system may book a dinner reservation with the user's favorite restaurant.

A user input may originate as speech. For example, a user may speak a user input that is captured by a device. The device may send the spoken user input to a distributed system.

The system may convert audio, representing the spoken user input, into text. The system may process the text to determine an intent of the user (e.g., an action to be performed by the system). This processing may be referred to as intent classification.

The system may also process the text to identify what the system thinks may be one or more entities represented in the user input. This processing may be referred to as named entity recognition (NER), whereby slots of text data are tagged to be associated with types of entities. A type of entity may correspond to a person, place, thing, or the like.

A system may include text representing entities known to the system. For example, such text may represent names singers, song titles, names of celebrities, names of political figures, locations, etc.

A system may attempt to determine a tagged slot of text (representing at least a portion of a user input) corresponds to text representing a known entity. For example, if the system identifies a portion of text (of a user input) that the system thinks may correspond to a singer's name, the system may compare the portion of text against text representing known singer names to determine a singer corresponding to the tagged portion of text. This processing may be referred to as entity resolution.

The foregoing text-based entity resolution can be improved for certain instances. For example, text representing known entities may be in a first language but text representing the user input may be in a second language. For further example, text representing a known entity may be a homonym of text representing the entity in the user input. In another example, the system may not be confident in the processing performed to convert audio (representing the user input) into text representing the user input. In a further example, text representing known entities may be in a first alphabet but text representing the user input may be in a second alphabet. In any of the foregoing situations, text-based entity resolution may be unsuccessful, or successful to a degree below a requisite threshold confidence.

The present disclosure improves the foregoing systems by providing a language agnostic phonetic searching as part of entity resolution. Language agnostic phonetic searching may be implemented as part of initial entity resolution, or language agnostic phonetic searching may be implemented as a fallback when text-based entity resolution is unsuccessful.

During offline operations, a system may convert text, representing entities known to a system, into audio representing the text. The text may be converted into audio using TTS processing, or other processing.

At runtime, as part of NLU processing, audio of the user input corresponding to a NER tagged entity may be compared against audio representing entities known to the system. If the system matches the audio of the tagged entity to audio representing a known entity, the system may use text representing the known entity to perform post-NLU processes.

Language agnostic phonetic searching of the present disclosure enables a system to successfully perform entity resolution in instances where text-based entity resolution may have otherwise failed. This is, in part, due to the fact that entities (e.g., nouns) may be pronounced the same or similarly across different languages even though the entities may be spelled differently in the different languages. Language agnostic phonetic searching of the present disclosure is also beneficial because it circumvents errors experienced in performing data conversions (e.g., converting audio of a spoken user input into corresponding text). Additionally, language agnostic phonetic searching of the present disclosure protects against situations where text, representing an entity known to the system, contains a typographical error but the text representing the entity in the user input does not contain the typographical error.

A system implementing the present disclosure may require user permission to perform the teachings herein. That is, a system may require a user opt in, with informed consent, prior to the system being able to implement the teachings herein with respect to the user.

FIG. 1 illustrates a system configured to perform entity resolution using language agnostic phonetic searching. Although the figures and discussion of the present disclosure illustrate certain operational steps of the system in a particular order, the steps described may be performed in a different order (as well as certain steps removed or added) without departing from the intent of the disclosure. A device 110 local to a user 5 may communicate with one or more servers 120 across one or more networks 199.

The user 5 may speak an input (comprising one or more utterances) to the device 110. The device 110 may capture audio 11 representing the spoken user input. The device 110 may generate audio data representing the audio 11 and send the audio data to the server(s) 120, which the server(s) 120 receives (132).

The server(s) 120 performs (134) ASR processing on the audio data to generate text data representing the spoken user input. As part of ASR processing, the server(s) 120 may generate metadata representing portions of audio data and their corresponding counterparts in the text data. Such associations may be performed at the phoneme level, word level, clause level, and/or some other level.

The server(s) 120 tags (136) the text data to notate a portion of the text data potentially corresponding to an entity. For example, the server(s) 120 may tag a word(s) in the text data as corresponding to a singer's name, a song title, a location, a political figure's name, etc. Such tagging may be referred to as named entity recognition (NER).

The server(s) 120 performs (138) entity resolution using the tagged portion of text data. The server(s) 120 compares the tagged portion of text data against text data representing entities known to the system. For example, if the tagged portion of text data is tagged as corresponding to a song title, the server(s) 120 may compare the tagged portion of text data against text data corresponding to song titles known to the system. Consequently, the server(s) 120 may refrain from comparing the tagged portion of text data against text data representing all entities known to the system, as such would result in significant latency.

In at least some situations, the server(s) 120 may determine (140) entity resolution, using the tagged portion of text data, failed. Entity resolution may be deemed to have failed if the server(s) 120 is unsuccessful in determining the tagged portion of text data corresponds to text data of at least one known entity. In other words, entity resolution may fail if the tagged portion of text data is determined to correspond to one or more known entities, but the server(s) 120's confidence in such determination does not satisfy a threshold confidence. For example, the server(s) 120 may determine the tagged portion of text data corresponds to more than one known entity. The server(s) 120 may assign a respective confidence value to each determined known entity. However, none of the confidence values may satisfy a threshold confidence value. In this situation, entity resolution may be deemed to have failed.

After determining text-based entity resolution has failed and/or after determining a confidence of ASR processing, for the word(s) comprising the entity, is below a threshold confidence (e.g., determining there is a significant probability that ASR has incorrect results for the entity), the server(s) 120 may determine (142) a portion of the audio data, received by the server(s) 120 at step 132, corresponding to the tagged portion of text data. The server(s) 120 may use the aforementioned metadata to identify one or more portions of the audio data corresponding to the tagged portion of the text data. More than one portion of the audio data may be determined if the audio data is segmented to a greater extent than the tagged portion of the text data (e.g., the tagged portion of the text data corresponds to one or more words and the audio data is segmented based on phonemes). By determining a portion(s) of the audio data as received by the server(s) 120 (e.g., that did not undergo ASR processing), the server(s) 120 is able to identify audio data that has not been polluted by one or more models implemented in ASR processing.

In addition to storing text representing entities known to the system, the server(s) 120 may also store audio data corresponding to those entities' textual representations. The server(s) 120 may perform (144) entity resolution using the determined portion of audio data. The server(s) 120 may compare the portion of audio data against audio data representing entities known to the system. Like with the aforementioned text-based entity resolution, this audio-based entity resolution may be performed using only a portion of the audio data corresponding to known entities. For example, if the tagged portion of text data is tagged as corresponding to a song title, the server(s) 120 may compare the portion of audio data (corresponding to the tagged portion of text data) against audio data corresponding to song titles known to the system. Such audio-based entity resolution may be performed at the phoneme level.

If the audio-based entity resolution is successful, the server(s) 120 may use (146) the resolved entity to perform downstream processes. For example, the server(s) 120 may send text data representing the resolved entity to a skill (described below), which may use the text data to perform an action responsive to the user input.

Figure 2:
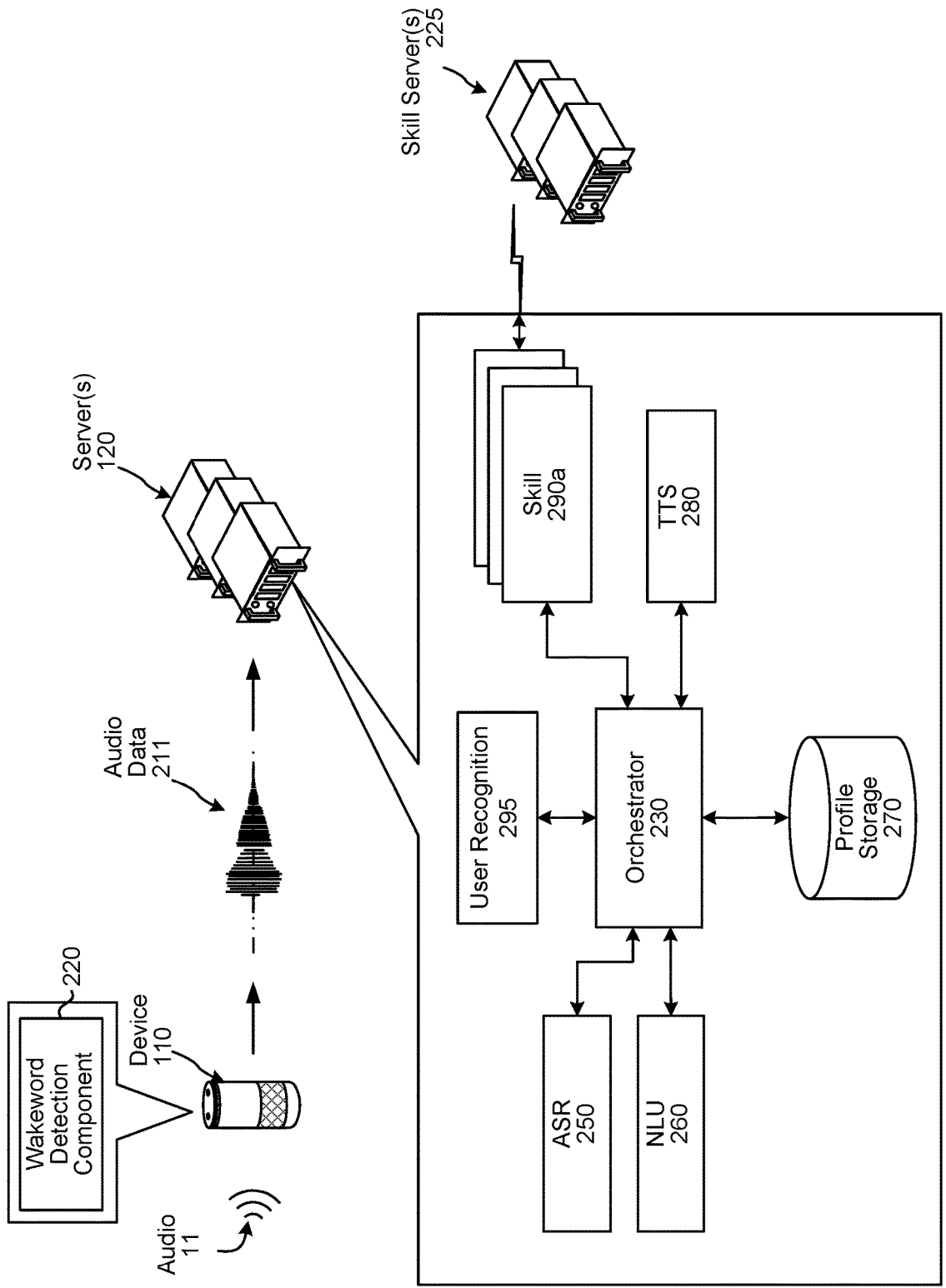
FIG. 2 is a conceptual diagram of components of a system according to embodiments of the present disclosure.

The system may operate using various components as described in FIG. 2. The various components may be located on same or different physical devices. Communication between various components may occur directly or across a network(s) 199.

An audio capture component(s), such as a microphone or array of microphones of the device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the server(s) 120. The audio data 211 may include data corresponding to the wakeword, or the portion of the audio corresponding to the wakeword may be removed by the device 110 prior to sending the audio data 211 to the server(s) 120.

Upon receipt by the server(s) 120, the audio data 211 may be sent to an orchestrator component 230. The orchestrator component 230 may include memory and logic that enables the orchestrator component 230 to transmit various pieces and forms of data to various components of the system, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data output by the ASR component 250 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrase(s) or statement(s) represented in the text data input therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the server(s) 120, a skill component 290, a skill server(s) 225, etc.) to execute the intent. For example, if the text data corresponds to "play Adele music," the NLU component 260 may determine an intent that the system output music and may identify "Adele" as an artist. For further example, if the text data corresponds to "what is the weather," the NLU component 260 may determine an intent that the system output weather information associated with a geographic location of the device 110. In another example, if the text data corresponds to "turn off the lights," the NLU component 260 may determine an intent that the system turn off lights associated with the device 110 and/or the user 5.

The NLU component 260 may send the NLU results data (which may include tagged text data, indicators of intent, etc.) to the orchestrator component 230. The orchestrator component 230 may send the NLU results data to a skill component(s) 290. If the NLU results data includes a single NLU hypothesis, the orchestrator component 230 may send the NLU results data to the skill component(s) 290 associated with the NLU hypothesis. If the NLU results data includes an N-best list of NLU hypotheses, the orchestrator component 260 may send the top scoring NLU hypothesis to a skill component(s) 290 associated with the top scoring NLU hypothesis.

A "skill component" may be software running on the server(s) 120 that is akin to a software application running on a traditional computing device. That is, a skill component 290 may enable the server(s) 120 to execute specific functionality in order to provide data or produce some other requested output. The server(s) 120 may be configured with more than one skill component 290. For example, a weather service skill component may enable the server(s) 120 to provide weather information, a car service skill component may enable the server(s) 120 to book a trip with respect to a taxi or ride sharing service, a restaurant skill component may enable the server(s) 120 to order a pizza with respect to the restaurant's online ordering system, etc. A skill component 290 may operate in conjunction between the server(s) 120 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

In addition or alternatively to being implemented by the server(s) 120, a skill component 290 may be implemented by a skill server(s) 225. Such may enable a skill server(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The server(s) 120 may be configured with a skill component 290 dedicated to interacting with the skill server(s) 225.

Unless expressly stated otherwise, reference to a skill, skill device, or skill component may include a skill component 290 operated by the server(s) 120 and/or skill operated by the skill server(s) 225. Moreover, the functionality described herein as a skill may be referred to using many different terms, such as an action, bot, app, or the like.

The server(s) 120 may include a TTS component 280 that generates audio data (e.g., synthesized speech) from text data using one or more different methods. Text data input to the TTS component 280 may come from a skill component 290, the orchestrator component 230, or another component of the system.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder. Synthesized speech generated by the TTS component 280 may be output to the user 5 in response to a user input.

The server(s) 120 may include profile storage 270. The profile storage 270 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information, as well as other information.

The profile storage 270 may include one or more user profiles, with each user profile being associated with a different user identifier. Each user profile may include various user identifying information. Each user profile may also include preferences of the user and/or one or more device identifiers, representing one or more devices of the user.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The server(s) 120 may include a user recognition component 295 that recognizes one or more users associated with data input to the system. The user recognition component 295 may take as input the audio data 211 and/or text data output by the ASR component 250. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.), received by the system in correlation with the present user input, to stored biometric data of users. The user recognition component 295 may further perform user recognition by comparing image data (e.g., including a representation of at least a feature of a user), received by the system in correlation with the present user input, with stored image data including representations of features of different users. The user recognition component 295 may perform additional user recognition processes, including those known in the art.

The user recognition component 295 determines scores indicating whether user input originated from a particular user. For example, a first score may indicate a likelihood that the user input originated from a first user, a second score may indicate a likelihood that the user input originated from a second user, etc. The user recognition component 295 may also determine an overall confidence regarding the accuracy of user recognition operations.

The user recognition component 295 may output a single user identifier corresponding to the most likely user that originated the user input. Alternatively, the user recognition component 295 may output an N-best list of user identifiers with respective scores indicating likelihoods of respective users originating the user input. The output of the user recognition component 295 may be used to inform NLU processing as well as processing performed by other components of the system.

Figure 3:
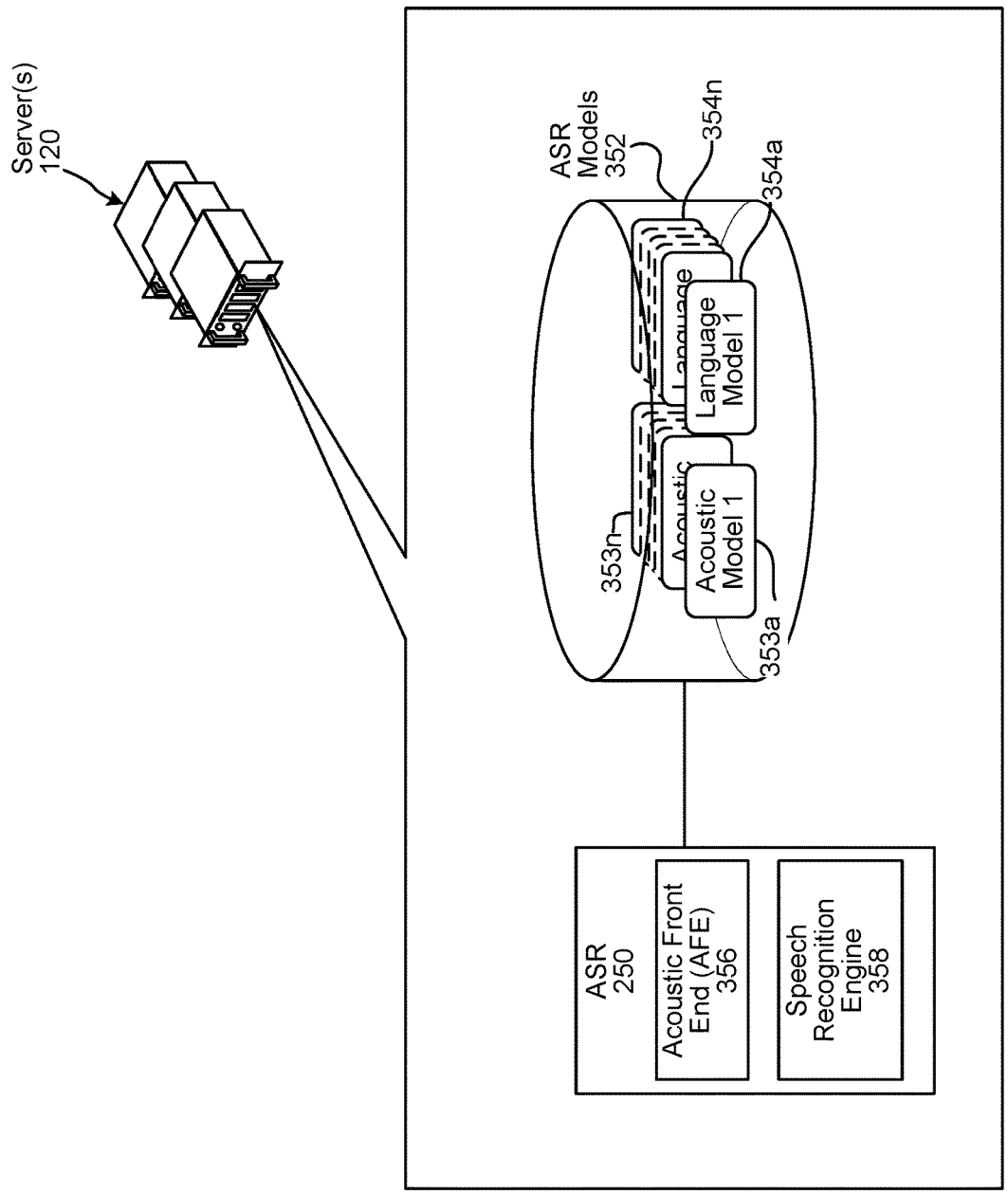
FIG. 3 is a conceptual diagram of how automatic speech recognition processing may be performed according to embodiments of the present disclosure.

As described above, the server(s) 120 may include an ASR component 250. FIG. 3 illustrates how ASR processing may be performed by the ASR component 250. The ASR component 250 may include an acoustic front end (AFE) 356 and a speech recognition engine 358. The AFE 356 transforms audio data, input to the ASR component 250, into data for processing by the speech recognition engine 358. The speech recognition engine 358 compares data with acoustic models 353, language models 354, and other models and information for recognizing speech represented in the audio data. The AFE 356 may reduce noise in the audio data and divide the digitized audio data into frames representing time intervals for which the AFE 356 determines a number of values, called features, representing the qualities of the audio data, along with a set of those values, called a feature vector, representing the features/qualities of the audio data within the frame. In an example, each audio frame includes 25 ms of audio and the frames start at 10 ms intervals resulting in a sliding window where adjacent audio frames include 15 ms of overlapping audio. Many different features for a particular frame may be determined, as known in the art, and each feature represents some quality of the audio that may be useful for ASR processing. A number of approaches may be used by the AFE 356 to process audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 358 may process the output from the AFE 356 with reference to information stored in ASR model storage 352. Alternatively, post front-end processed data (such as feature vectors) may be received by the ASR component 250 from another source besides the internal AFE 356. For example, the device 110 may process audio data into feature vectors (for example using an on-device AFE) and transmit that information to the server(s) 120. Feature vectors may arrive at the server(s) 120 encoded, in which case they may be decoded prior to processing by the speech recognition engine 358.

The speech recognition engine 358 attempts to match received feature vectors to language phonemes and words as known in the acoustic models 353 and language models 354. The speech recognition engine 358 computes recognition scores for the feature vectors based on acoustic information and language information. The acoustic information is used to calculate an acoustic score representing a likelihood that the sound represented by a group of feature vectors matches a language phoneme. The language information is used to adjust the acoustic score by considering what sounds and/or words are used in context with each other, thereby improving the likelihood that the ASR component 250 will output text that makes sense grammatically. The specific models used may be general models or may be models corresponding to a particular domain, such as music, banking, etc.

The speech recognition engine 358 may use a number of techniques to match feature vectors to phonemes, for example using Hidden Markov Models (HMMs) to determine probabilities that feature vectors may match phonemes. Sounds in data input to the speech recognition engine 358 may be represented as paths between states of the HMM and multiple paths may represent multiple possible text matches for the same sound. Instead of (or in addition to) phonemes, senons may be used as an acoustic unit. A senon is an acoustic realization of a phoneme. Each phoneme may have a number of different sounds depending on its context (e.g., the surrounding phonemes). While English may have approximately 50 phonemes, it has several thousand senons. Use of senons in ASR processing may allow for improved ASR results.

Figure 4:
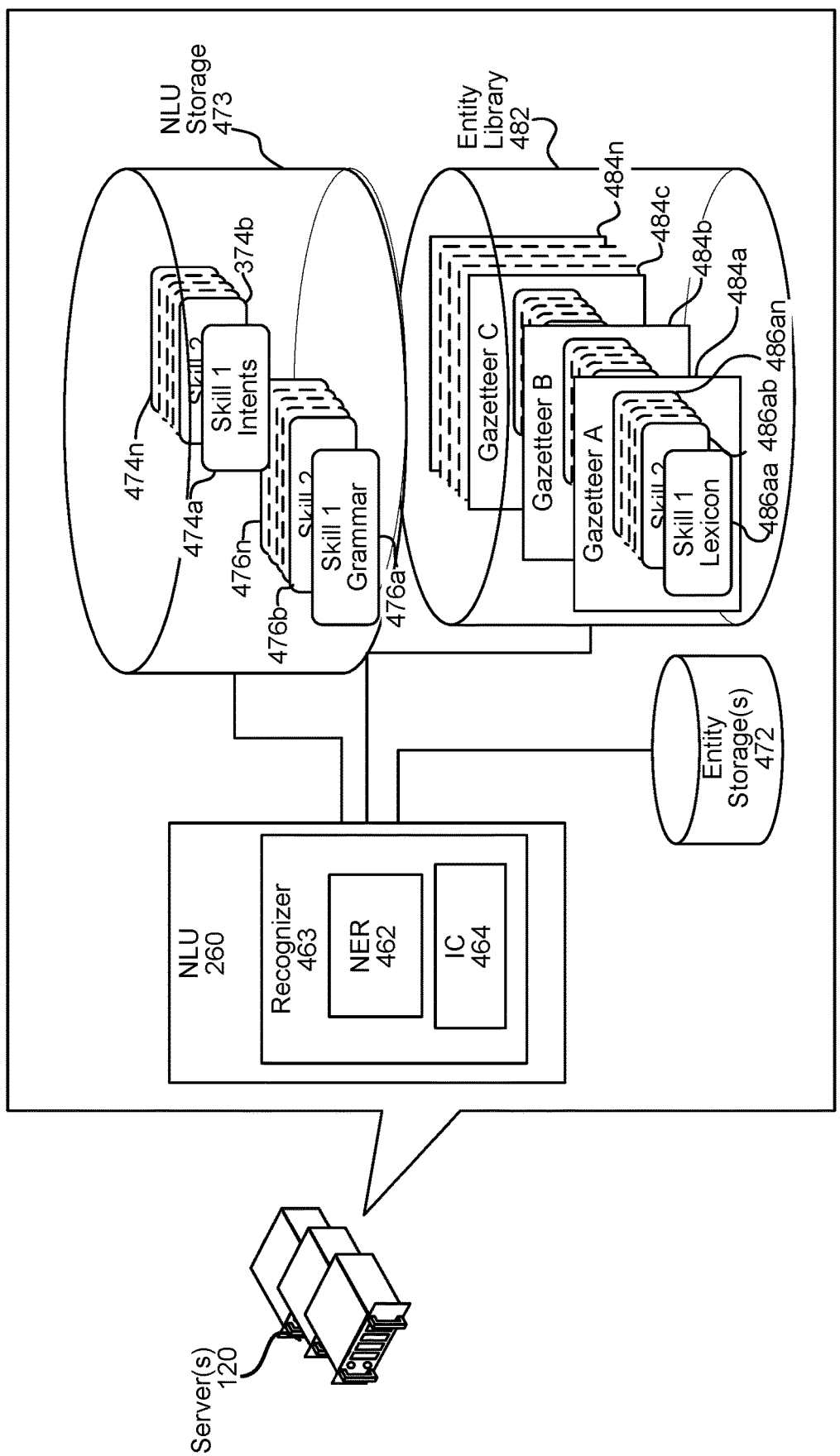
FIG. 4 is a conceptual diagram of how natural language understanding processing may be performed according to embodiments of the present disclosure.

The text data output by the ASR component 250 may be sent to the NLU component 260. FIG. 4 illustrates how NLU processing may be performed on text data. Generally, the NLU component 260 attempts to make a semantic interpretation of text data input thereto. That is, the NLU component 260 determines the meaning behind text data based on the individual words and/or phrases represented therein. The NLU component 260 interprets text data to derive an intent of the user as well as pieces of the text data that allow a device (e.g., the device 110, the server(s) 120, skill server(s) 225, etc.) to complete that action. For example, if the NLU component 260 receives text data corresponding to "tell me the weather," the NLU component 260 may determine that the user intends the system to output weather information.

The NLU component 260 may process text data corresponding to several ASR hypotheses. For example, if the ASR component 250 outputs text data including an N-best list of ASR hypotheses, the NLU component 260 may process the text data with respect to all (or a portion of) the ASR hypotheses represented therein. Even though the ASR component 250 may output an N-best list of ASR hypotheses, the NLU component 260 may be configured to only process with respect to one or more top scoring ASR hypothesis in the N-best list.

The NLU component 260 may annotate text data by parsing and/or tagging the text data. For example, for the text data "tell me the weather for Seattle," the NLU component 260 may tag "Seattle" as a location for the weather information.

The NLU component 260 may include one or more recognizers 463. Each recognizer 463 may be associated with a different skill component 290. Each recognizer 463 may process with respect to text data input to the NLU component 260. Each recognizer 463 may operate at least partially in parallel with other recognizers 463 of the NLU component 260.

Each recognizer 463 may include a named entity recognition (NER) component 462. The NER component 462 attempts to identify grammars and lexical information that may be used to construe meaning with respect to text data input therein. The NER component 462 identifies portions of text data that correspond to a named entity that may be applicable to processing performed by a skill component 290, associated with the recognizer 463 implementing the NER component 462. The NER component 462 (or other component of the NLU component 260) may also determine whether a word refers to an entity whose identity is not explicitly mentioned in the text data, for example "him," "her," "it" or other anaphora, exophora, or the like.

Each recognizer 463, and more specifically each NER component 462, may be associated with a particular grammar model and/or database 473, a particular set of intents/ actions 474, and a particular personalized lexicon 486. Each gazetteer 484 may include skill-indexed lexical information associated with a particular user and/or device 110. For example, a Gazetteer A (484a) includes skill-indexed lexical information 486aa to 486an. A user's music skill lexical information might include album titles, artist names, and song names, for example, whereas a user's contact list skill lexical information might include the names of contacts. Since every user's music collection and contact list is presumably different. This personalized information improves later performed entity resolution.

An NER component 462 applies grammar models 476 and lexical information 486 associated with the skill component 290 (associated with the recognizer 463 implementing the NER component 462) to determine a mention of one or more entities in text data. In this manner, the NER component 462 identifies "slots" (each corresponding to one or more particular words in text data) that may be useful for later processing. The NER component 462 may also label each slot with a type (e.g., noun, place, city, artist name, song name, etc.).

Each grammar model 476 includes the names of entities (i.e., nouns) commonly found in speech about the particular skill component 290 to which the grammar model 476 relates, whereas the lexical information 486 is personalized to the user and/or the device 110 from which the user input originated. For example, a grammar model 476 associated with a shopping skill component may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (484a-484n) stored in an entity library storage 482. The gazetteer information 484 may be used to match text data (representing a portion of the user input) with text data representing known entities, such as song titles, contact names, etc. Gazetteers 484 may be linked to users (e.g., a particular gazetteer may be associated with a specific user's music collection), may be linked to certain skill components 290 (e.g., a shopping skill component, a music skill component, a video skill component, etc.), or may be organized in a variety of other ways.

Each recognizer 463 may also include an intent classification (IC) component 464. An IC component 464 parses text data to determine an intent(s) (associated with the skill component 290 associated with the recognizer 463 implementing the IC component 464) that potentially represents the user input. An intent represents to an action a user desires be performed. An IC component 464 may communicate with a database 474 of words linked to intents. For example, a music intent database may link words and phrases such as "quiet," "volume off," and "mute" to a <Mute> intent. An IC component 464 identifies potential intents by comparing words and phrases in text data (representing at least a portion of the user input) to the words and phrases in an intents database 474 (associated with the skill component 290 that is associated with the recognizer 463 implementing the IC component 464).

The intents identifiable by a specific IC component 464 are linked to skill-specific (i.e., the skill component 290 associated with the recognizer 463 implementing the IC component 464) grammar frameworks 476 with "slots" to be filled. Each slot of a grammar framework 476 corresponds to a portion of text data that the system believes corresponds to an entity. For example, a grammar framework 476 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 476 may not be structured as sentences, but rather based on associating slots with grammatical tags.

For example, an NER component 462 may parse text data to identify words as subject, object, verb, preposition, etc. based on grammar rules and/or models prior to recognizing named entities in the text data. An IC component 464 (implemented by the same recognizer 463 as the NER component 462) may use the identified verb to identify an intent. The NER component 462 may then determine a grammar model 476 associated with the identified intent. For example, a grammar model 476 for an intent corresponding to <PlayMusic> may specify a list of slots applicable to play the identified "object" and any object modifier (e.g., a prepositional phrase), such as {Artist Name}, {Album Name}, {Song name}, etc. The NER component 462 may then search corresponding fields in a lexicon 486 (associated with the skill component 290 associated with the recognizer 463 implementing the NER component 462), attempting to match words and phrases in text data the NER component 462 previously tagged as a grammatical object or object modifier with those identified in the lexicon 486.

An NER component 462 may perform semantic tagging, which is the labeling of a word or combination of words according to their type/semantic meaning. An NER component 462 may parse text data using heuristic grammar rules, or a model may be constructed using techniques such as Hidden Markov Models, maximum entropy models, log linear models, conditional random fields (CRF), and the like. For example, an NER component 462 implemented by a music skill recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 462 identifies "Play" as a verb based on a word database associated with the music skill, which an IC component 464 (also implemented by the music skill recognizer) may determine corresponds to a <PlayMusic> intent. At this stage, no determination has been made as to the meaning of "mother's little helper" or "the rolling stones," but based on grammar rules and models, the NER component 462 has determined the text of these phrases relates to the grammatical object (i.e., entity) of the user input represented in the text data.

An NER component 462 may tag text data to attribute meaning thereto. For example, an NER component 462 may tag "play mother's little helper by the rolling stones" as: {skill} Music, {intent}<PlayMusic>, {artist name} rolling stones, {media type} SONG, and {song title} mother's little helper. For further example, the NER component 462 may tag "play songs by the rolling stones" as: {skill} Music, {intent}<PlayMusic>, {artist name} rolling stones, and {media type} SONG.

Figure 5:
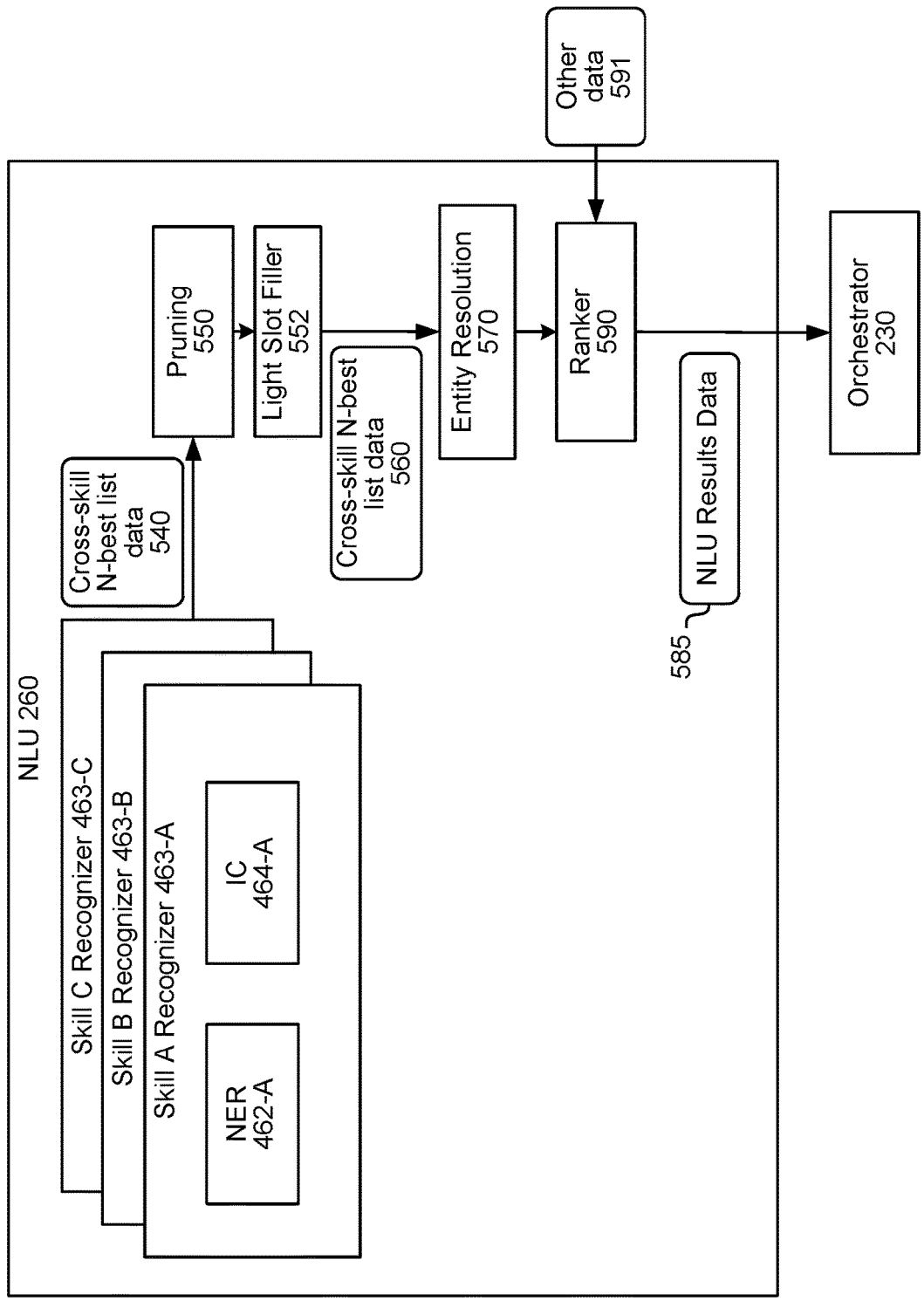
FIG. 5 is a conceptual diagram of how natural language understanding processing may be performed according to embodiments of the present disclosure.

The NLU component 260 may generate cross-skill N-best list data 540, which may include a list of NLU hypotheses output by each recognizer 463 (as illustrated in FIG. 5). A recognizer 463 may output tagged text data generated by an NER component 462 and an IC component 464 operated by the recognizer 463, as described above. Each NLU hypothesis, including an intent indicator and text/slots identified by the NER component 462, may be grouped as an NLU hypothesis represented in the cross-skill N-best list data 540. Each NLU hypothesis may also be associated with a value representing the NLU component's confidence in the NLU hypothesis. For example, the cross-skill N-best list data 540 may be represented as, with each line representing a separate NLU hypothesis:

[0.95] Intent: <PlayMusic> ArtistName: Lady Gaga SongName: Poker Face

[0.95] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The NLU component 260 may send the cross-skill N-best list data 540 to a pruning component 550. The pruning component 550 may sort the NLU hypotheses represented in the cross-skill N-best list data 540 according to their respective scores. The pruning component 550 may then perform value thresholding with respect to the cross-skill N-best list data 540. For example, the pruning component 550 may select NLU hypotheses represented in the cross-skill N-best list data 540 associated with confidence values satisfying (e.g., meeting and/or exceeding) a threshold confidence value. The pruning component 550 may also or alternatively perform number of NLU hypothesis thresholding. For example, the pruning component 550 may select a maximum threshold number of top scoring NLU hypotheses. The pruning component 550 may generate cross-skill N-best list data 560 including the selected NLU hypotheses. The purpose of the pruning component 550 is to create a reduced list of NLU hypotheses so that downstream, more resource intensive, processes may only operate on the NLU hypotheses that most likely represent the user's intent.

The NLU component 260 may also include a light slot filler component 552. The light slot filler component 552 can take text data from slots, represented in the NLU hypotheses output by the pruning component 550, and alter it to make the text data more easily processed by downstream components. The light slot filler component 552 may perform low latency operations that do not involve heavy operations such as reference to one or more entity storages. The purpose of the light slot filler component 552 is to replace words with other words or values that may be more easily understood by downstream system components. For example, if an NLU hypothesis includes the word "tomorrow," the light slot filler component 552 may replace the word "tomorrow" with an actual date for purposes of downstream processing. Similarly, the light slot filler component 552 may replace the word "CD" with "album" or the words "compact disc." The replaced words are then included in the cross-skill N-best list data 560.

The NLU component 260 sends the cross-skill N-best list data 560 to an entity resolution component 570. The entity resolution component 570 can apply rules or other instructions to standardize labels or tokens from previous stages into an intent/slot representation. The precise transformation may depend on the skill component 290. For example, for a travel skill component, the entity resolution component 570 may transform text data corresponding to "Boston airport" to the standard BOS three-letter code referring to the airport. The entity resolution component 570 can refer to an entity storage(s) (including text data representing entities known to the system) to resolve the precise entity referred to in each slot of each NLU hypothesis represented in the cross-skill N-best list data 560. Specific intent/slot combinations may also be tied to a particular source, which may then be used to resolve the text data. In the example "play songs by the stones," the entity resolution component 570 may reference a personal music catalog, Amazon Music account, user profile data, or the like. The entity resolution component 570 may output text data including an altered N-best list that is based on the cross-skill N-best list data 560, and that includes more detailed information (e.g., entity IDs) about the specific entities mentioned in the slots and/or more detailed slot data that can eventually be used by a skill component 290. The NLU component 260 may include multiple entity resolution components 570 and each entity resolution component 570 may be associated with one or more particular skill components 290.

The entity resolution component 570 may use frameworks linked to the intent to determine what database fields should be searched to determine the meaning of tagged entities, such as searching a user's gazetteer 484 for similarity with the framework slots. For example, a framework for a <PlayMusic> intent might indicate to attempt to resolve an identified object based on {Artist Name}, {Album Name}, and {Song name}, and another framework for the same intent might indicate to attempt to resolve an object modifier based on {Artist Name}, and resolve the object based on {Album Name} and {Song Name} linked to an identified {Artist Name}. If the search of the gazetteer 484 does not resolve a slot/field using gazetteer information, the entity resolution component 570 may search a database of generic words associated with the skill component 290 (in the entity storage(s) 472). For example, if the text data includes "play songs by the rolling stones," after failing to determine an album name or song name called "songs" by "the rolling stones," the entity resolution component 570 may search the skill vocabulary for the word "songs." In the alternative, generic words may be checked before the gazetteer information, or both may be tried, potentially producing two different results.

After intent classification and named entity recognition are performed, the likely intent of the user input as well as potential entities in the text data (representing the user input) are identified along with their type. Such may be referred to as "slots" in the user input. For example, the user input "Alexa, play music by Madonna" may correspond to a <PlayMusic> intent with an ArtistName slot with the slot value "Madonna." This information is passed to the entity resolution component 570.

For each slot, the entity resolution component 570 looks up a slot value in a variety of data catalogs/search services storing text representing known entities to the system. The catalogs to use for the query may be determined by the intent and slot types passed to the entity resolution component 570.

Each queried catalog may use the slot value to generate a search. The search is executed and the associated catalog "entities" (e.g., entities known to the system) are returned along with scores indicating how relevant the entities are. Both the search generation and scoring may be specific to the catalog and underlying technology used. For example, some catalogs use Elasticsearch as the underlying data store, and generate Elasticsearch queries that return results ranked by a relevancy score. The relevancy score may be determined based on term frequency, inverse document frequency, and/or field length normalization. Other catalogues may use other custom relevancy metrics.

After each catalog returns its most relevant results, the entity resolution component 570 performs a final reranking across the queried catalog results. This reranking can be done based on lexical features (e.g., text edit distance, matching the language of the entities to the user input language, etc.), popularity, and/or based on user preferences.

The entity resolution component 570 may not be successful in resolving every entity and filling every slot represented in the cross-skill N-best list data 560. This may result in the entity resolution component 570 outputting incomplete results.

The NLU component 260 may include a ranker component 590. The ranker component 590 may assign a particular confidence value to each NLU hypothesis input therein. The confidence value of an NLU hypothesis may represent a confidence of the system in the NLU processing performed with respect to the NLU hypothesis. The confidence value of a particular NLU hypothesis may be affected by whether the NLU hypothesis has unfilled slots. For example, if an NLU hypothesis associated with a first skill component includes slots that are all filled/resolved, that NLU hypothesis may be assigned a higher confidence value than another NLU hypothesis including at least some slots that are unfilled/unresolved by the entity resolution component 570.

The ranker component 590 may apply re-scoring, biasing, or other techniques to determine the top scoring NLU hypotheses. To do so, the ranker component 590 may consider not only the data output by the entity resolution component 570, but may also consider other data 591. The other data 591 may include a variety of information. The other data 591 may include skill component rating or popularity data. For example, if one skill component 290 has a particularly high rating, the ranker component 590 may increase the confidence value of an NLU hypothesis associated with that skill component 290. The other data 591 may also include information about skill components 290 that have been enabled for the user identifier and/or device identifier associated with the current user input. For example, the ranker component 590 may assign higher confidence values to NLU hypotheses associated with enabled skill components 290 than NLU hypotheses associated with non-enabled skill components 290. The other data 591 may also include data indicating user usage history, such as if the user identifier associated with the current user input is regularly associated with user input that invokes a particular skill component 290 or does so at particular times of day. The other data 591 may additionally include data indicating date, time, location, weather, type of device 110, user identifier, device identifier, context, as well as other information. For example, the ranker component 590 may consider when any particular skill component 290 is currently active (e.g., music being played, a game being played, etc.) with respect to the user or device associated with the current user input. The other data 591 may also include device type information. For example, if the device 110 does not include a display, the ranker component 590 may decrease the confidence values associated with NLU hypotheses that would result in displayable content being output by the system.

Following ranking by the ranker component 590, the NLU component 260 may output NLU results data 585 to the orchestrator component 230. The orchestrator component 230 may send at least a portion of the NLU results data 585 to a skill component 290, thereby invoking the skill component 290 to perform an action responsive to the user input. The NLU results data 585 may include multiple top scoring NLU hypotheses (e.g., in the form of an N-best list) as determined by the ranker component 590. Alternatively, the NLU results data 585 may include the top scoring NLU hypothesis as determined by the ranker component 590. The NLU results data 585 may be a rich data object representing intents and resolved entities.

A confidence value generated by a component of the NLU component 260 (and another component of the system) may be a numeric value (e.g., on a scale of 0 to 1, 0 to 1000, or some other scale). Alternatively, a confidence value may be a binned value (e.g., a numeric value range of 0 to 0.33 may correspond to a binned value of "low," a numeric value range of 0.34 to 0.66 may correspond to a binned value of "medium," and a numeric value range of 0.67 to 1.0 may correspond to a binned value of "high").

Figure 6:
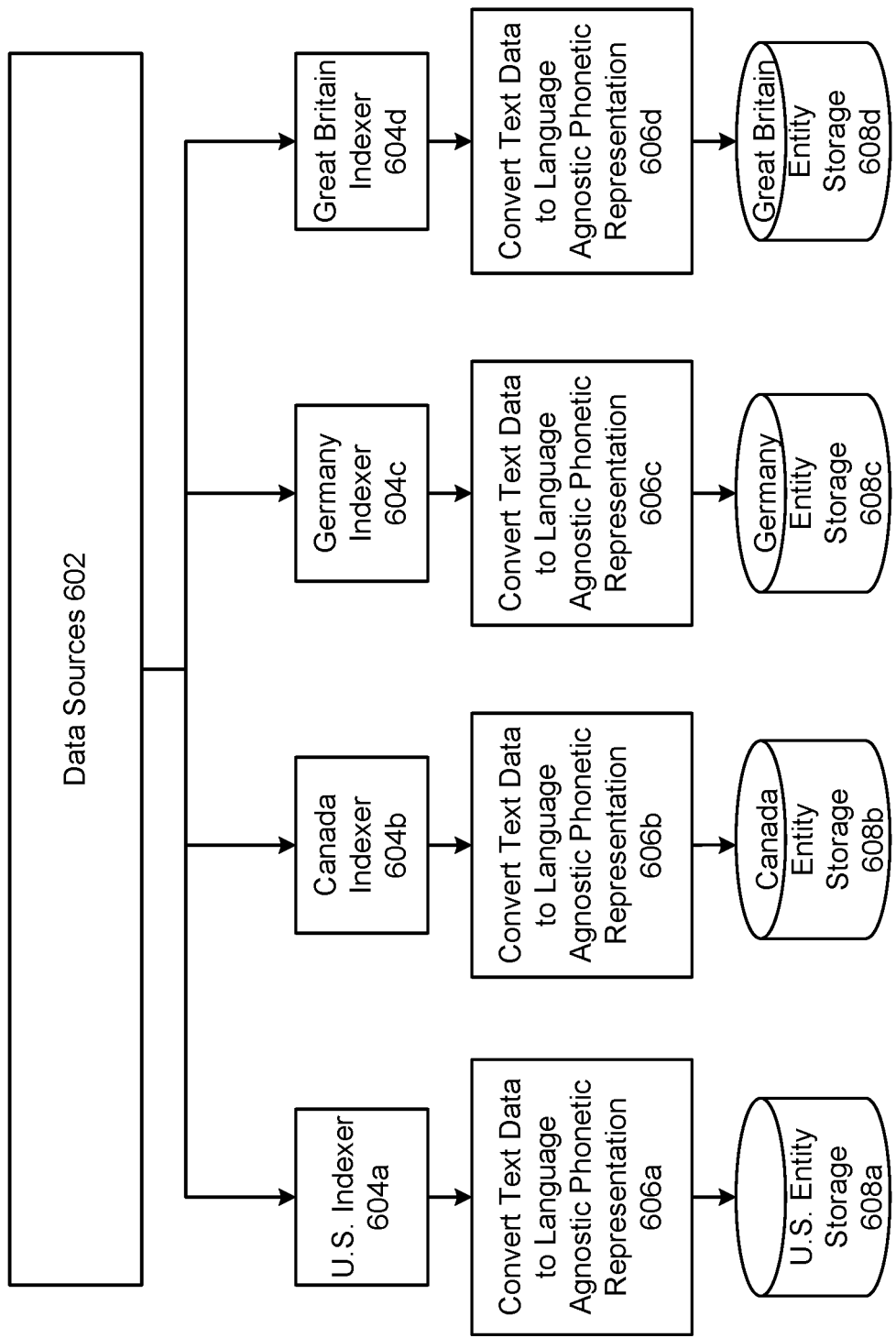
FIG. 6 is a conceptual diagram of how entity storages, including audio data representing entities known to a system, are generated according to embodiments of the present disclosure.

As described above, the system may be configured with one or more entity storages including text data representing entities known to the system. The system may also include one or more entity storages including audio data representing entities known to the system. FIG. 6 illustrates how entities storages including such audio data may be generated. Generation of the entity storages may occur offline.

The system may include various data sources 602 that include text data representing entities known to the system. The data sources 602 may include the entity storage(s) 472 used to perform text-based entity resolution (as described above), but the data sources 602 may not be limited thereto.

An entity may be pronounced differently based on locale. For example, a user in the United States speaking English may pronounce an entity differently than a user in Canada speaking English, which may pronounce the entity differently than a user in Germany speaking German, which may pronounce the entity differently than a user in Great Britain speaking English, etc. The system may segment the audio-based entity storages based on language and locale, as illustrated in FIG. 6.

The system may include various indexers 604. Each indexer 604 may convert at least a portion of text representing a known entity into a desired form (e.g., convert numbers into corresponding words). Each indexer 604 may implement language and locale specific rules. For example, a U.S. indexer 604a may convert text based on rules applicable to U.S. English grammar, a Canada indexer 604b may convert text based on rules applicable to Canada English grammar, a Germany indexer 604c may convert text based on rules applicable to German grammar, a Great Britain indexer 604d may convert text based on rules applicable to Great Britain English grammar, etc. The rules implemented by one indexer may be different from the rules implemented by another indexer.

Text data output by an indexer 604 may be converted into audio data corresponding to a language agnostic phonetic representation of the text data (represented as 606). Text data may be converted into audio data using various techniques. Processes performable by the TTS component 280 may be performed on the text data. For example, unit selection and/or parametric synthesis may be performed on the text data. The unit selection and/or parametric synthesis may be performed based on particular languages. For example, 606a may involve performing unit selection and/or parametric synthesis on text data output by the U.S. indexer 604a to generate audio data including U.S. English speech, 606b may involve performing unit selection and/or parametric synthesis on text data output by the Canada indexer 604b to generate audio data including Canada English speech, 606c may involve performing unit selection and/or parametric synthesis on text data output by the Germany indexer 604c to generate audio data including German speech, 606d may involve performing unit selection and/or parametric synthesis on text data output by the Great Britain indexer 604d to generate audio data including Great Britain English speech, etc.

Different voice models may be used when converting the text data output by an indexer into audio data using unit selection and/or parametric synthesis. Such enables the system to generate different pronunciations of a single entity (e.g., male pronunciation, female pronunciation, and different accents (e.g., a Japanese user speaking English)). This is beneficial because each pronunciation may include a different phonetic representation of the same entity.

In another example, text data output by an indexer may be converted into audio data using a grapheme-to-phoneme (G2P) model(s). The G2P model(s) may be similar to that used to train acoustic models 353 of the ASR component 250.

In another example, the system may identify previously recorded speech that has been annotated to represent a specific piece of text. As described, ASR processing may include the generation of metadata representing portions of audio data and their corresponding counterparts in generated text data. Text data output by an indexer 604 may be converted into audio data, corresponding to a language agnostic phonetic representation of the text data, using the metadata, audio data, and text data of previous user inputs.

The generated audio data may be stored in respective entity storage(s) 608, as illustrated in FIG. 6. Each entity storage 608 may store audio data corresponding to various entities known to the system. An entity storage 608 may be segmented based on entity type (e.g., singer names, locations, song titles, etc.).

Figure 7:
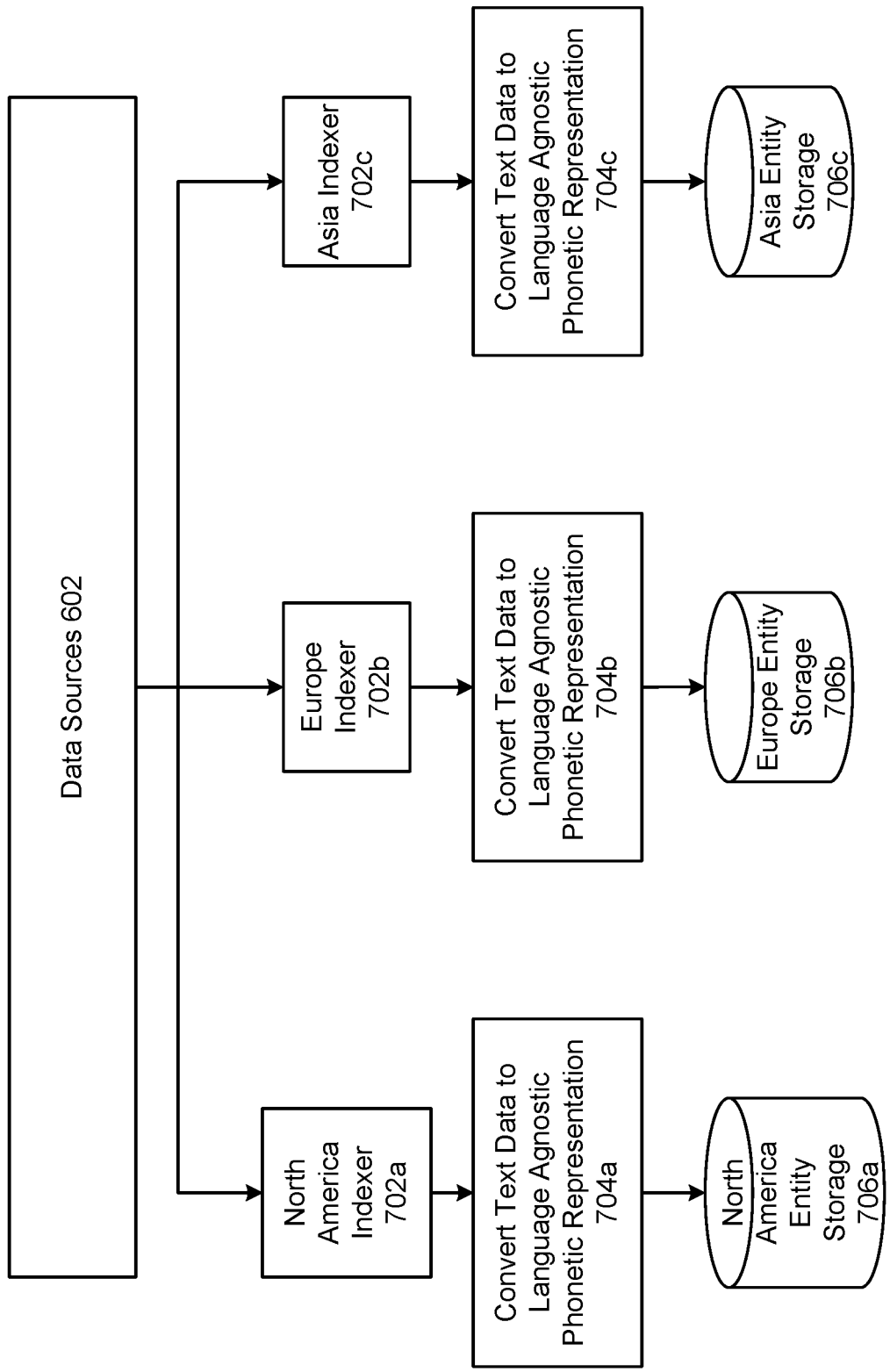
FIG. 7 is a conceptual diagram of how entity storages, including audio data representing entities known to a system, are generated according to embodiments of the present disclosure.

As illustrated in FIG. 6, an entity storage 608 may store audio data including speech of a given country (e.g., the United States, Canada, Germany, Great Britain). The system may also or alternatively store audio data of entities known to the system at the regional level, as illustrated in FIG. 7.

The system may be configured with various indexers 702 that convert at least a portion of text representing a known entity into a desired form (e.g., convert numbers into corresponding words). Each indexer 702 may implement language and locale specific rules. For example, a North America indexer 702a may convert text based on a first set of rules, a Europe indexer 702b may convert text based on a second set of rules, an Asia indexer 702c may convert text based on third set of rules, etc. The rules implemented by one indexer may be different from the rules implemented by another indexer.

Text data output by an indexer 702 may be converted into audio data corresponding to a language agnostic phonetic representation of the text data (represented as 704). Text data may be converted into audio data using various techniques, such as unit selection, parametric synthesis, or using a G2P model(s).

The audio data generated for a particular entity storage 706 may include more than one language. Users of a particular region (e.g., North America, Europe, Asia, etc.) may speak different languages. Thus, the audio data generated for and stored in an entity storage 706 may include languages frequently spoken by users of the region associated with the entity storage 706. For example, for a single entity, a North America entity storage 706a may include audio data including English speech and audio data including Spanish speech. For further example, for a single entity, a Europe entity storage 706b may include audio data including English speech, audio data including French speech, audio data including Spanish speech, and audio data including German speech. In another example, for a single entity, an Asia entity storage 706c may include audio data including English speech, audio data including Russian speech, and audio data including Chinese speech. Whether an entity storage 706 is configured to include all languages spoken by users of a region (to which the entity storage 706 is associated) or only a subset of the languages may depend on system configuration.

The types of entity storages illustrated in FIGS. 6 and 7 are illustrative. Thus, one skilled in the art will appreciate that entity storages associated with other countries, continents, geo-political boundaries, and/or regions may be implemented by the system without departing from the present disclosure.

One skilled in the art will also appreciate that each entity (known to the system and included in the data sources 602) may be converted into speech of each language represented in the entity storages (608/706). For example, according to FIG. 6, a single entity may be represented as if it were spoken in U.S. English, Canada English, German, and Great Britain English. As a result, an entity corresponding to a first locale (e.g., an American singer) may be represented as if it were spoken by users of that locale (e.g., the United States) as well as users of different locales (e.g., Canada, Germany, Great Britain, etc.).

Figure 8:
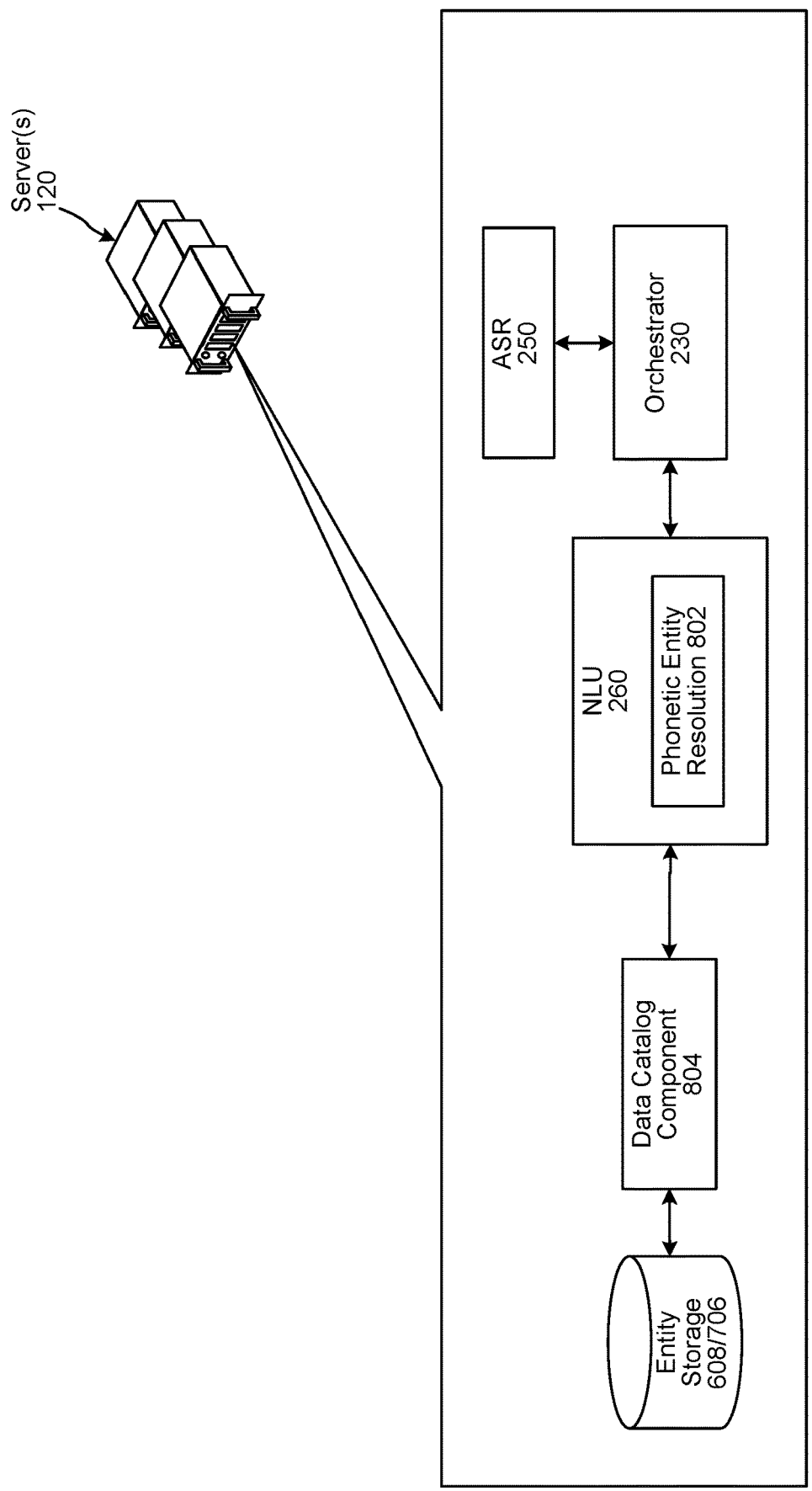
FIG. 8 is a conceptual diagram of how entity resolution using may be performed using language agnostic phonetic searching according to embodiments of the present disclosure.

After the entity storages 608 and/or 706 have been generated, language agnostic phonetic searching may be performed as part of entity resolution at runtime (as illustrated in FIG. 8). The NLU component 260 may include a phonetic entity resolution component 802 configured to perform entity resolution using language agnostic phonetic searching. The phonetic entity resolution component 802 may be invoked to perform entity resolution (i) at least partially in parallel to the entity resolution component 570, (ii) instead of the entity resolution component 570, or (iii) the phonetic entity resolution component 802 may be invoked after it is determined that results of the entity resolution component 570 fail to satisfy a confidence threshold. In some instances, text-based entity resolution may fail and/or a confidence of ASR processing, for the word(s) comprising the entity, may be below a threshold confidence (e.g., representing there is a significant probability that ASR has incorrect results for the entity).

The phonetic entity resolution component 802 may send, to the orchestrator component 230, text data representing an entity tagged by an NER component 462. The orchestrator component 230 may send, to the ASR component 250, the text data along with an instruction to provide audio data (received by the ASR component 250 but not processed by the ASR component 250) corresponding to the text data. As described above, during ASR processing, the ASR component 250 may generate metadata representing portions of ASR input audio data to which respective portions of ASR output text data correspond. The ASR component 250 may use the metadata to identify a portion of audio data corresponding to the text data. The ASR component 250 may send the audio data to the orchestrator component 230, which may send the audio data to the NLU component 260 (and more particularly the phonetic entity resolution component 802).

The phonetic entity resolution component 802 determines a location associated with the user input. Such location may be determined based on a location of the device 110 that captured the user input. For example, the system may determine a device identifier associated with the device 110, determine a profile associated with the device identifier, and determine the profile represents a location of the device 110. Such location may also or alternatively be determined based on an identity of the user 5 that spoke the user input. For example, the system may determine a user identifier associated with the user input (e.g., as determined by the user recognition component 295), may determine a profile associated with the user identifier, and may determine the profile represents a location associated with the user. While the location associated with the user may not correspond to the location of the device 110 (e.g., when the user is travelling and speaking to a device at a different location than where the user typically resides), the location associated with the user may be informative as to what language the user may have spoken in the user input.

By determining the location associated with the user input, the system is able to determine which entity storage(s) (608/706) to query to resolve the entity. For example, if the location corresponds to the United States, the system may query the U.S. entity storage 608a and/or the North America entity storage 706a, depending on system configuration.

The system determines at least one data catalog component (804) (e.g., service provider interface (SPI) or other component of the system) configured to query an appropriate entity storage (608/706). If the system determines only one entity storage (608/706) is to be queried, the system may determine a data catalog component 804 associated with the entity storage (608/706). If the system determines more than one entity storage (608/706) is to be queried, the system may determine a first data catalog component associated with one of the entity storages and a second data catalog component associated with another of the entity storages to be queried. While it is described that each data catalog component 804 is configured to query a single entity storage (608/706), one skilled in the art will appreciate that other configurations are possible.

The NLU component 260 sends, to a data catalog component 804, the audio data corresponding to the entity to be resolved. The data catalog component 804 queries an entity storage (608/706), with which the data catalog component 804 is associated, to resolve the entity. For example, the data catalog component 804 may perform phonetic matching of the audio data (representing the entity to be resolved) to audio data stored in the entity storage (608/706). The data catalog component 804 may generate an N-best list of known entities, with each known entity being associated with a confidence value representing the data catalog component 804's confidence that the known entity corresponds to the entity in the user input. The data catalog component 804 may send the N-best list of known entities to the NLU component 260.

Phonetic matching may not be exact. Thus, fuzzy logic may be used. For example, an edit distance algorithm with a confusion matrix specific to the phonetic alphabet may be implemented. An edit distance algorithm determines the number of changes needed to make one sequence of data equal to another sequence of data. Different changes may be possible. Each change may be associated with a different score. Various known techniques, such as Cosine distance, Euclidean distance, Manhattan distance, or other techniques may be used for determining a difference between word usage, or word usage vectors. Known techniques such as using a Levenshtein distance may be used for determining a difference between text strings.

Prior to querying an entity storage (608/706), a component of the system may run an acoustic model on the audio data (output by the ASR component 250 and corresponding to the entity in the user input to be resolved, phonetically) to remove noise from the audio data.

As described above, more than one data catalog component 804 may be called to query an entity storage (608/706). Each data catalog component may query an associated entity storage and generate a separate N-best list based on the known entities in the associated entity storage. Moreover, each data catalog component may send its generated N-best list of known entities (with associated confidence values) to the NLU component. 260.

The phonetic entity resolution component 802 receives the N-best list output by each called data catalog component 804 and performs a cross-data catalog component reranking. That is, the phonetic entity resolution component 802 generates a new N-best list of known entities based on the N-best lists output by the called data catalog components 804. The N-best list of known entities generated by the phonetic entity resolution component 802 may include known entities, and their respective scores, from a single N-best list output by a single data catalog component 804 or from multiple N-best lists output by different data catalog components 804.

The phonetic entity resolution component 802 may consider various data when generating its N-best list. For example, the phonetic entity resolution component 802 may consider a lexical distance between the audio data (representing the entity in the user input to be resolved) and the determined known entities, user preferences, popularity of the known entities, the user's system usage history, etc.

The phonetic entity resolution component 802 may perform confidence value thresholding. For example, the N-best list generated by the phonetic entity resolution component 802 may only include known entities associated with confidence values satisfying (e.g., meeting and/or exceeding) a threshold confidence value. The phonetic entity resolution component 802 may also or alternatively perform number of known entity thresholding. For example, the N-best list generated by the phonetic entity resolution component 802 may not include any more than a maximum number of top scoring known entities.

The NLU component 260 may incorporate content of the N-best list output by the phonetic entity resolution component 802 into the NLU hypotheses of the NLU results data 585. That is, the NLU component 260 may resolve previously unresolved entities in the NLU results data 585 using one or more known entities represented in the N-best list output by the phonetic entity resolution component 802. Thus, one or more known entities in the N-best list output by the phonetic entity resolution component 802 may be used by a skill component 290 to perform an action responsive to the user input.

The NLU component 260 may be configured to not automatically incorporate content of the N-best list output by the phonetic entity resolution component 802 into the NLU hypotheses of the NLU results data 585. For example, the NLU component 260 may not automatically incorporate content of the N-best list output by the phonetic entity resolution component 802 into the NLU results data 585 when none of the confidence values (associated with known entities in the N-best list output by the phonetic entity resolution component 802) satisfy a threshold confidence value. For further example, the NLU component 260 may not automatically incorporate content of the N-best list output by the phonetic entity resolution component 802 into the NLU results data 585 when confidence values (associated with known entities in the N-best list output by the phonetic entity resolution component 802) are within a threshold deviation of each other (e.g., the NLU component 260 cannot confidently disambiguate which known entity was intended by the user). When either of the foregoing situations occur, the NLU component 260 may compare at least one confidence value (represented in the N-best list of known entities output by the entity resolution component 570) with at least one confidence value (represented in the N-best list of known entities output by the phonetic entity resolution component 802). The NLU component 260 may then select the N-best list having the higher confidence value(s) for incorporation into the NLU results data 585.

Prior to incorporating content of an N-best list output by an entity resolution component into the NLU results data 785, the system may output content to the user. The content may include audio representing a known entity (represented in an N-best list output by an entity resolution component) and audio requesting the user indicate whether the known entity corresponds to what the user intended. For example, the system could output audio corresponding to "did you mean [phonetic pronunciation of known entity]." If the user responds affirmatively (e.g., in the form of speech), the NLU component 260 may incorporate that known entity into the NLU results data 585.

As described above, language agnostic phonetic searching may be performed with respect to an entity storage(s) (608/706) populated offline. In some instances, language agnostic phonetic searching may be performed using audio data (representing known entities) generated at runtime. While such processing may create added latency, such latency may be outweighed by the results of not performing such runtime processing (e.g., determining a user input cannot be responded to and indicating same to the user). After determining the location associated with the user input, the system may convert text data (representing known entities in the data sources 602) into audio data corresponding to one or more languages associated with the location. One or more data catalog components 804 may then be called to perform phonetic searching using the foregoing audio data and audio data (output by the ASR component 250) representing an entity to be resolved, as described above.

While the description of FIG. 8 above relates to processing performed to resolve a single entity of a user input, one skilled in the art will appreciate that the processes of FIG. 8 described above may be performed with respect to more than one entity of a user input.

Figure 9:
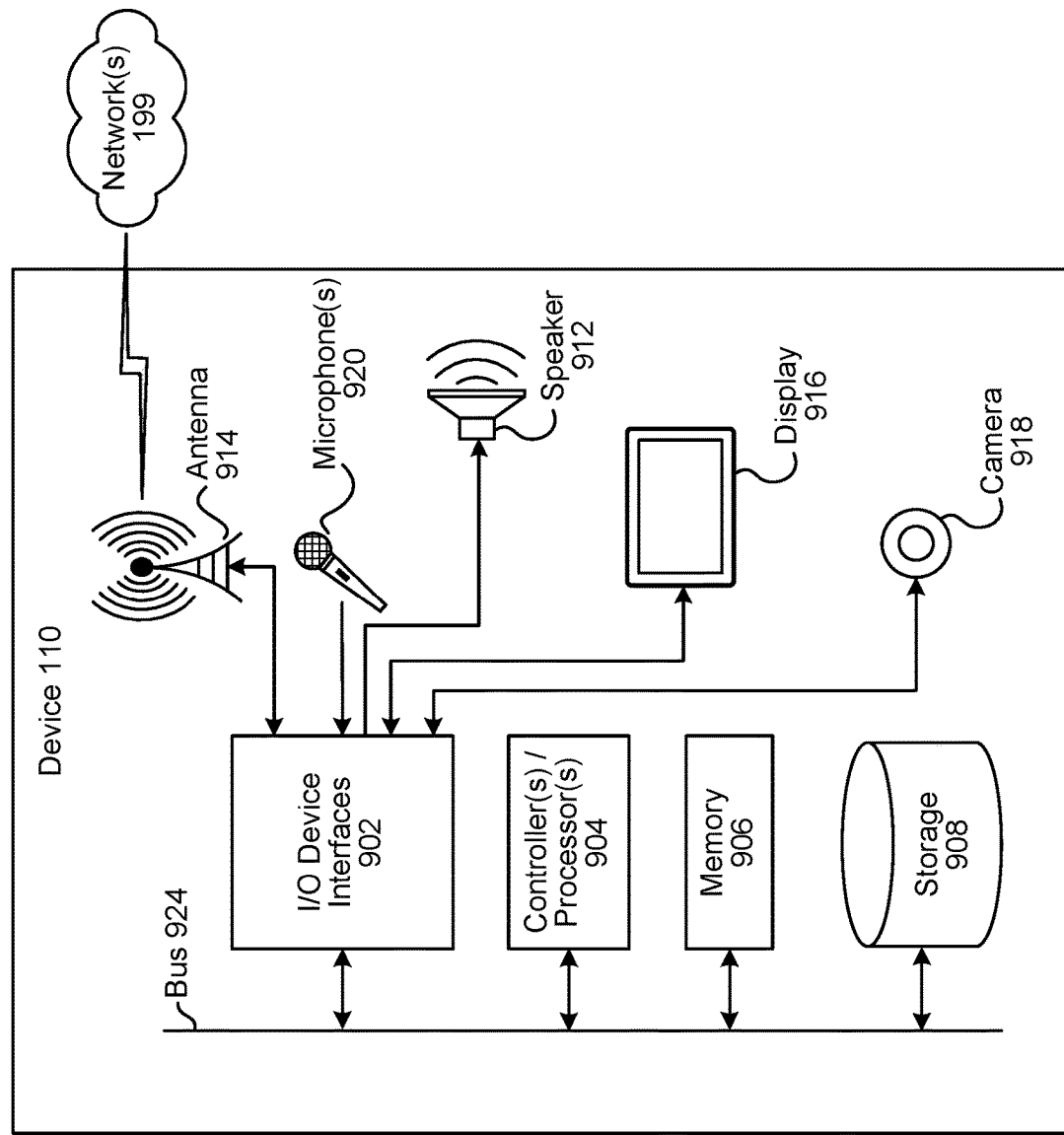
FIG. 9 is a block diagram conceptually illustrating example components of a device according to embodiments of the present disclosure.
Figure 10:
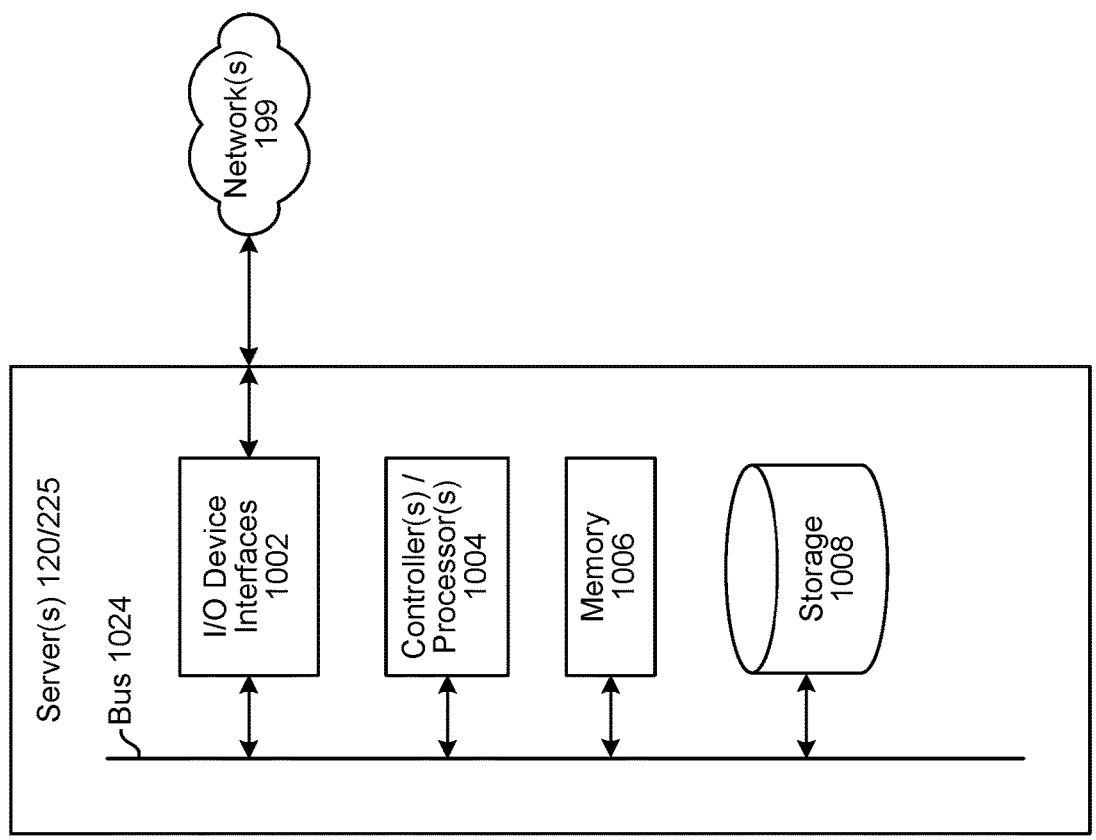
FIG. 10 is a block diagram conceptually illustrating example components of a server according to embodiments of the present disclosure.

FIG. 9 is a block diagram conceptually illustrating a device 110 that may be used with the system. FIG. 10 is a block diagram conceptually illustrating example components of a remote device, such as the server(s) 120, which may assist with ASR processing, NLU processing, etc., and the skill server(s) 225. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers (120/225) may be included in the system, such as one or more servers 120 for performing ASR processing, one or more servers 120 for performing NLU processing, one or more skill server(s) 225 for performing actions responsive to user inputs, etc. In operation, each of these devices (or groups of devices) may include computer-readable and computer-executable instructions that reside on the respective device (120/225), as will be discussed further below.

Each of these devices (110/120/225) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/225) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (902/1002).

Computer instructions for operating each device (110/120/225) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/225) includes input/output device interfaces (902/1002). A variety of components may be connected through the input/output device interfaces (902/1002), as will be discussed further below. Additionally, each device (110/120/225) may include an address/data bus (924/1024) for conveying data among components of the respective device. Each component within a device (110/120/225) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/

1002) may also include communication components that allow data to be exchanged between devices such as different physical servers in a collection of servers or other components.

The components of the device(s) 110, the server(s) 120, or the skill server(s) 225 may include their own dedicated processors, memory, and/or storage. Alternatively, one or more of the components of the device(s) 110, the server(s) 120, or the skill server(s) 225 may utilize the I/O interfaces (902/1002), processor(s) (904/1004), memory (906/1006), and/or storage (908/1008) of the device(s) 110 server(s) 120, or the skill server(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the server(s) 120, and the skill server(s) 225, as described herein, are illustrative, and may be located as a stand-alone device or may be included, in whole or in part, as a component of a larger device or system.

Figure 11:
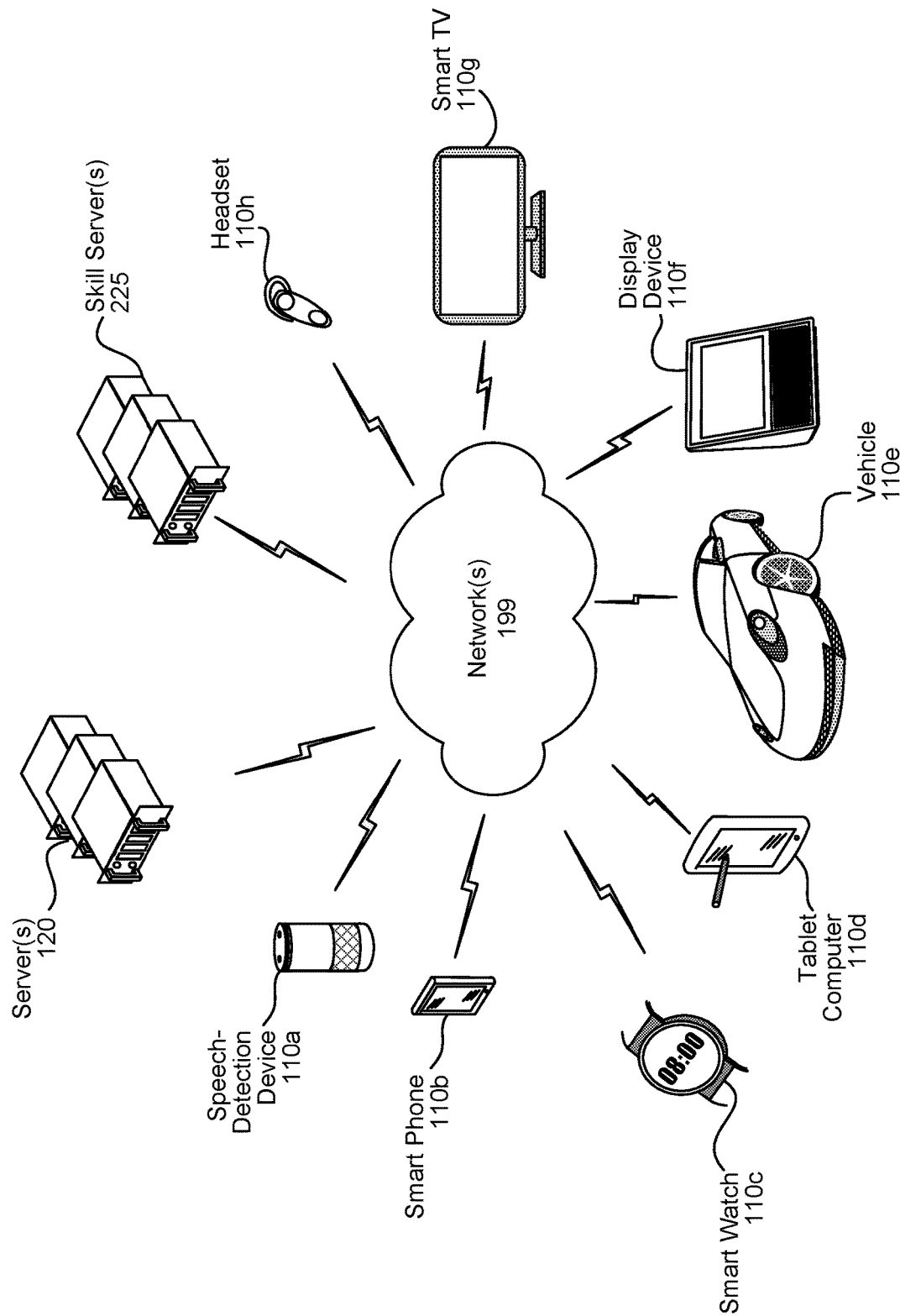
FIG. 11 illustrates an example of a computer network for use with the speech processing system.

As illustrated in FIG. 11, multiple devices (110a-110h, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, and/or a wired or wireless headset 110h may be connected to the network(s) 199 through a wireless service provider, over a WiFi or cellular network connection, or the like. Other devices are included as network-connected support devices, such as the server(s) 120, the skill server(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
during offline operations occurring within a first time period:
identifying first text data representing a first known entity;
determining first audio data in a first language associated with the first known entity; and
storing the first audio data in a first entity resolution storage associated with a first location, the first location being associated with the first language; and
during runtime operations occurring within a second time period after the first time period:
receiving, from a device, second audio data representing a first user input;

performing automatic speech recognition (ASR) processing on the second audio data to generate second text data, wherein the ASR processing includes associating a portion of the second audio data with a corresponding portion of the second text data;

performing named entity recognition (NER) processing on the second text data to determine the portion of the second text data potentially corresponds to a known entity;

determining a first confidence value representing the portion of the second text data corresponds to third text data represented in a second entity resolution storage, the second entity resolution storage storing text data representing known entities;

determining the first confidence value fails to satisfy a first threshold confidence value;

after determining the first confidence value fails to satisfy the first threshold confidence value, identifying the portion of the second audio data corresponding to the portion of the second text data;

determining first phonemes of the portion of the second audio data correspond to second phonemes of first audio data stored in the first entity resolution storage;

after determining the first phonemes correspond to the second phonemes, identifying the first text data; and causing an action, responsive to the first user input, to be performed using the first text data.

2. The method of claim 1, further comprising:
determining audio characteristics representing the second audio data;
determining the audio characteristics correspond to stored audio characteristics associated with a user identifier;
determining user profile data associated with the user identifier;
determining the user profile data represents the first location; and
determining the first phonemes correspond to the second phonemes based at least in part on the user profile data representing the first location.

3. The method of claim 1, further comprising:
determining a second confidence value representing the first phonemes correspond to the second phonemes;
determining a third confidence value representing the first phonemes correspond to third phonemes of third audio data stored in the first entity resolution storage;
determining the second confidence value is within a threshold deviation of the third confidence value;
based at least in part on the second confidence value being within the threshold deviation of the third confidence value and based at least in part on the second confidence value being greater than the third confidence value, generating fourth audio data requesting whether the first audio data corresponds to the first user input;
causing the device to output audio corresponding to the fourth audio data;
receiving, from the device, fifth audio data representing a second user input;
determining the first audio data represents the first audio data corresponds to the first user input; and
identifying the first text data after determining the first audio data represents the first audio data corresponds to the first user input.

4. The method of claim 1, further comprising:
determining a second confidence value representing the first phonemes correspond to the second phonemes;
determining the second confidence value fails to satisfy a second threshold confidence value;

after determining the second confidence value fails to satisfy the second threshold confidence value, determining the second confidence value is greater than the first confidence value; and
identifying the first text data after determining the second confidence value is greater than the first confidence value.

5. A method, comprising:
receiving, from a device, first input audio data representing a first user input;
performing automatic speech recognition (ASR) processing on the first input audio data to generate ASR results data, wherein a first portion of the ASR results data represents a first portion of the first input audio data and a second portion of the ASR results data represents a second portion of the first input audio data;
performing named entity recognition (NER) processing on the ASR results data to determine that the first portion of the ASR results data potentially corresponds to a known entity;
after determining the first portion of the ASR results data potentially corresponds to a known entity, identifying the first portion of the first input audio data represented by the first portion of the ASR results data;
determining that the first portion of the first input audio data potentially matches first stored audio data representing a pronunciation of a name of a first known entity;
determining entity data corresponding to the first known entity; and
including the entity data in natural language understanding (NLU) results data.

6. The method of claim 5, wherein the first stored audio data is stored in a first entity storage, the method further comprising:
determining a first confidence value representing the first portion of the ASR results data corresponds to third text data represented in a second entity storage, the second entity storage storing text data representing known entities;
determining the first confidence value fails to satisfy a first threshold confidence value; and
identifying the first portion of the first input audio data after determining the first confidence value fails to satisfy the first threshold confidence value.

7. The method of claim 6, further comprising:
determining a second confidence value representing the first portion of the first input audio data potentially matches the first stored audio data;
determining the second confidence value fails to satisfy a second threshold confidence value;
after determining the second confidence value fails to satisfy the second threshold confidence value, determining the second confidence value is greater than the first confidence value; and
after determining the second confidence value is greater than the first confidence value, including the entity data in the NLU results data.

8. The method of claim 5, wherein determining that the first portion of the first input audio data potentially matches the first stored audio data comprises:
comparing phonemes representing the first portion of the first input audio data to phonemes representing the first stored audio data.

9. The method of claim 5, wherein the first stored audio data is stored in a first entity storage, the method further comprising:

determining the first entity storage is associated with a first geographic area;
determining a second entity storage is associated with a second geographic area;
determining the first user input is associated with the first geographic area; and
based at least in part on the first user input being associated with the first geographic area, determining that the first portion of the first input audio data potentially matches the first stored audio data stored in the first entity storage.

10. The method of claim 5, further comprising:
generating output audio data requesting whether the first stored audio data corresponds to the first user input;
causing the device to output audio corresponding to the output audio data;
receiving, from the device, fourth second input audio data representing a second user input;
determining the second input audio data represents the first stored audio data corresponds to the first user input; and
after determining the second input audio data represents the first stored audio data corresponds to the first user input, including the entity data in the NLU results data.

11. The method of claim 5, wherein the first stored audio data is stored in a first entity storage, the method further comprising:
determining that the first portion of the first input audio data potentially matches second stored audio data representing a pronunciation of a second name of a second known entity, the second stored audio data being stored in a second entity storage.

12. The method of claim 5, wherein the first stored audio data is stored in a first entity storage, the method further comprising:
determining that the first portion of the first input audio data potentially matches second stored audio data representing a pronunciation of a name of a second known entity, the second stored audio data being stored in the first entity storage.

13. A system, comprising:
at least one processor; and
at least one memory comprising instructions that, when executed by the at least one processor, cause the system to:
receive, from a device, first input audio data representing a first user input;
perform automatic speech recognition (ASR) processing on the first input audio data to generate ASR results data, wherein a first portion of the ASR results data represents a first portion of the first input audio data and a second portion of the ASR results data represents a second portion of the first input audio data;
perform named entity recognition (NER) processing on the ASR results data to determine that the first portion of the ASR results data potentially corresponds to a known entity;
after determining the first portion of the ASR results data potentially corresponds to a known entity, identify the first portion of the first input audio data represented by the first portion of the ASR results data;
determine that the first portion of the first input audio data potentially matches first stored audio data representing a pronunciation of a name of a first known entity;
determine entity data corresponding to the first known entity; and
include the entity data in natural language understanding (NLU) results data.

14. The system of claim 13, wherein the first stored audio data is stored in a first entity storage, and the at least one memory further comprises instructions that, when executed by the at least one processor, further cause the system to:
determine a first confidence value representing the first portion of the ASR results data corresponds to third text data represented in a second entity storage, the second entity storage storing text data representing known entities;
determine the first confidence value fails to satisfy a first threshold confidence value; and
identify the first portion of the first input audio data after determining the first confidence value fails to satisfy the first threshold confidence value.

15. The system of claim 14, wherein the at least one memory further comprises instructions that, when executed by the at least one processor, further cause the system to:
determine a second confidence value representing the first portion of the first input audio data potentially matches the first stored audio data;
determine the second confidence value fails to satisfy a second threshold confidence value;
after determining the second confidence value fails to satisfy the second threshold confidence value, determine the second confidence value is greater than the first confidence value; and
after determining the second confidence value is greater than the first confidence value, include the entity data in the NLU results data.

16. The system of claim 13, wherein the at least one memory further comprises instructions that, when executed by the at least one processor, further cause the system to:
determine that the first portion of the first input audio data potentially matches the first stored audio data by comparing phonemes representing the first portion of the first input audio data to phonemes representing the first stored audio data.

17. The system of claim 13, wherein the first stored audio data is stored in a first entity storage, and the at least one memory further comprises instructions that, when executed by the at least one processor, further cause the system to:
determine the first entity storage is associated with a first geographic area;
determine a second entity storage is associated with a second geographic area;
determine the first user input is associated with the first geographic area; and
based at least in part on the first user input being associated with the first geographic area, determining that the first portion of the first input audio data potentially matches the first stored audio data stored in the first entity storage.

18. The system of claim 13, wherein the at least one memory further comprises instructions that, when executed by the at least one processor, further cause the system to:
generate output audio data requesting whether the first stored audio data corresponds to the first user input;
cause the device to output audio corresponding to the output audio data;
receive, from the device, second input audio data representing a second user input;
determine the second input audio data represents the first stored audio data corresponds to the first user input; and after determining the second input audio data represents the first stored audio data corresponds to the first user input, include the entity data in the NLU results data.

19. The system of claim 13, wherein the first stored audio data is stored in a first entity storage, and the at least one memory further comprises instructions that, when executed by the at least one processor, further cause the system to:
determine that the first portion of the first input audio data potentially matches second stored audio data representing a pronunciation of a second name of a second known entity, the second stored audio data being stored in a second entity storage.

20. The system of claim 13, wherein the first stored audio data is stored in a first entity storage, and the at least one memory further comprises instructions that, when executed by the at least one processor, further cause the system to:
determine that the first portion of first input audio data potentially matches second stored audio data representing a pronunciation of a name of a second known entity, the second stored audio data being stored in the first entity storage.

21. The system of claim 13, wherein the at least one memory further comprises instructions that, when executed by the at least one processor, further cause the system to:
generate, during the ASR processing, metadata indicating that the first portion of the ASR results data represents the first portion of the first input audio data, wherein identifying the first portion of the first input audio data is based on the metadata.

22. The method of claim 5, further comprising:
generating, during the ASR processing, metadata indicating that the first portion of the ASR results data represents the first portion of the first input audio data, wherein identifying the first portion of the first input audio data is based on the metadata.

* * * * *